US012768759B2

(12) United States Patent
Rahmlow

(10) Patent No.: US 12,768,759 B2
(45) Date of Patent: Oct. 20, 2026

(54) CONTINUOUS FIELD FLOW FRACTIONATOR

(71) Applicant: Wyatt Technology, LLC, Goleta, CA (US)

(72) Inventor: David Rahmlow, Goleta, CA (US)

(73) Assignee: Wyatt Technologies, LLC, Goleta, CA (US)

( * ) Notice: Subject to any disclaimer, the term of this patent is extended or adjusted under 35 U.S.C. 154(b) by 270 days.

(21) Appl. No.: 18/468,171

(22) Filed: Sep. 15, 2023

(65) Prior Publication Data

US 2024/0094100 A1 Mar. 21, 2024

Related U.S. Application Data

(60) Provisional application No. 63/406,723, filed on Sep. 15, 2022.

(51) Int. Cl.
*G01N 1/40* (2006.01)

(52) U.S. Cl.
CPC .................................. *G01N 1/4005* (2013.01)

(58) Field of Classification Search
None
See application file for complete search history.

(56) References Cited

U.S. PATENT DOCUMENTS 5,193,688 A * 3/1993 Giddings ........... G01N 30/0005 209/127.1
11,639,367 B2 5/2023 Criscione et al.
2012/0144900 A1* 6/2012 Wyatt ................ G01N 30/0005 356/337
2016/0238571 A1 8/2016 Welz et al.
2021/0018474 A1 1/2021 Yamada
2022/0118407 A1* 4/2022 Trainoff ............... B01D 63/088
2022/0134286 A1* 5/2022 Trainoff ............. G01N 30/0005
2023/0134435 A1* 5/2023 Trainoff ................. B01D 61/00 73/61.41

FOREIGN PATENT DOCUMENTS

CN 1345624 A 4/2002
CN 118401834 A 7/2024
JP 2011247874 A 12/2011

OTHER PUBLICATIONS

Non-Final Office Action in U.S. Appl. No. 18/468,288 mailed on Jun. 16, 2026.

* cited by examiner

*Primary Examiner* — Daniel S Larkin
(74) *Attorney, Agent, or Firm* — Schmeiser Olsen PLLC

(57) ABSTRACT

A continuous field flow fractionator includes a membrane, a bottom plate assembly and a top plate assembly that includes an inject port, an inlet port, at least one orthogonal flow inlet port, at least one orthogonal flow outlet port, and at least two sample outlet ports. The top plate assembly, the membrane, and the bottom plate assembly define a separation channel. The solvent flowing from the at least one orthogonal flow inlet port impinges on particles of a sample flowing between the inject port to the at least two sample outlet ports in the orthogonal flow region. The particles of the sample flow to the at least two sample outlet ports according to sizes of the particles of the sample, resulting in fractions of the sample in accordance with the sizes of the particles.

5 Claims, 9 Drawing Sheets

CONTINUOUS FIELD FLOW FRACTIONATOR

PRIORITY

This application claims priority to U.S. Provisional Patent Application No. 63/406,723, filed Sep. 15, 2022, and titled "CONTINUOUS FIELD FLOW FRACTIONATOR."

BACKGROUND

The present disclosure relates to field flow fractionators, and more specifically, to a field flow fractionator.

SUMMARY

In one embodiment, a continuous field flow fractionator (CFFF) includes a top plate assembly that includes an inject port, an inlet port, at least one orthogonal flow inlet port, at least one orthogonal flow outlet port, and at least two sample outlet ports. The CFFF further includes a membrane and a bottom plate assembly. The top plate assembly, the membrane, and the bottom plate assembly define a separation channel. A solvent flowing from the at least one orthogonal flow inlet port to the at least one orthogonal flow outlet port defines an orthogonal flow region. The solvent flowing from the at least one orthogonal flow inlet port impinges on particles of a sample flowing between the inject port to the at least two sample outlet ports in the orthogonal flow region. The particles of the sample flow to the at least two sample outlet ports according to sizes of the particles of the sample, resulting in fractions of the sample in accordance with the sizes of the particles.

In another embodiment, a continuous field flow fractionator (CFFF) includes a top plate assembly that includes an inject port, an inlet port, a hold port, and a sample outlet port. The CFFF further includes a first membrane, a first frit, a second membrane, a second frit, and a bottom plate assembly. The top plate assembly, the membranes, the frits, and the bottom plate assembly define a separation channel. During a hold phase, solvent flowing from the inlet port, sample flowing from the inject port, and solvent flowing from the hold port define an accumulation region. Solvent flowing from the hold port impinges on particles of the sample flowing from the inject port. A set of the particles flows back toward the accumulation region. A remainder of the particles flow toward the sample outlet port. During a transfer phase, a subset of the set of particles flows toward the sample outlet port, such that during a subsequent hold phase, the subset of particles elutes through the sample outlet port, resulting in at least one fraction of the sample for a cycle corresponding to each of the hold phase and the transfer phase.

In another embodiment, a continuous field flow fractionator (CFFF) includes a top plate assembly that includes an inject port, an inlet port, at least one orthogonal flow inlet port, at least one orthogonal flow outlet port, at least one top cross flow port, at least one bottom cross flow port, and at least two sample outlet ports. The CFFF further includes a top membrane, a top frit, a bottom membrane, a bottom frit, and a bottom plate assembly. The top plate assembly, the membranes, the frits, and the bottom plate assembly define a separation channel. During a down state, solvent flowing toward the bottom cross flow port impinges on particles of sample flowing from the inlet port thereby pining the particles onto the bottom membrane, solvent from the at least one orthogonal flow inlet port impinges on the particles, resulting in the particles flowing toward the at least two sample outlet ports at a height above the bottom membrane according to sizes of the particles. During an up state, solvent flowing toward the top cross flow port impinges on particles of sample flowing from the inlet port thereby pining the particles onto the top membrane, solvent from the at least one orthogonal flow inlet port impinges on the particles, resulting in the particles flowing toward the at least two sample outlet ports at a height below the top membrane according to sizes of the particles.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Figure 1:
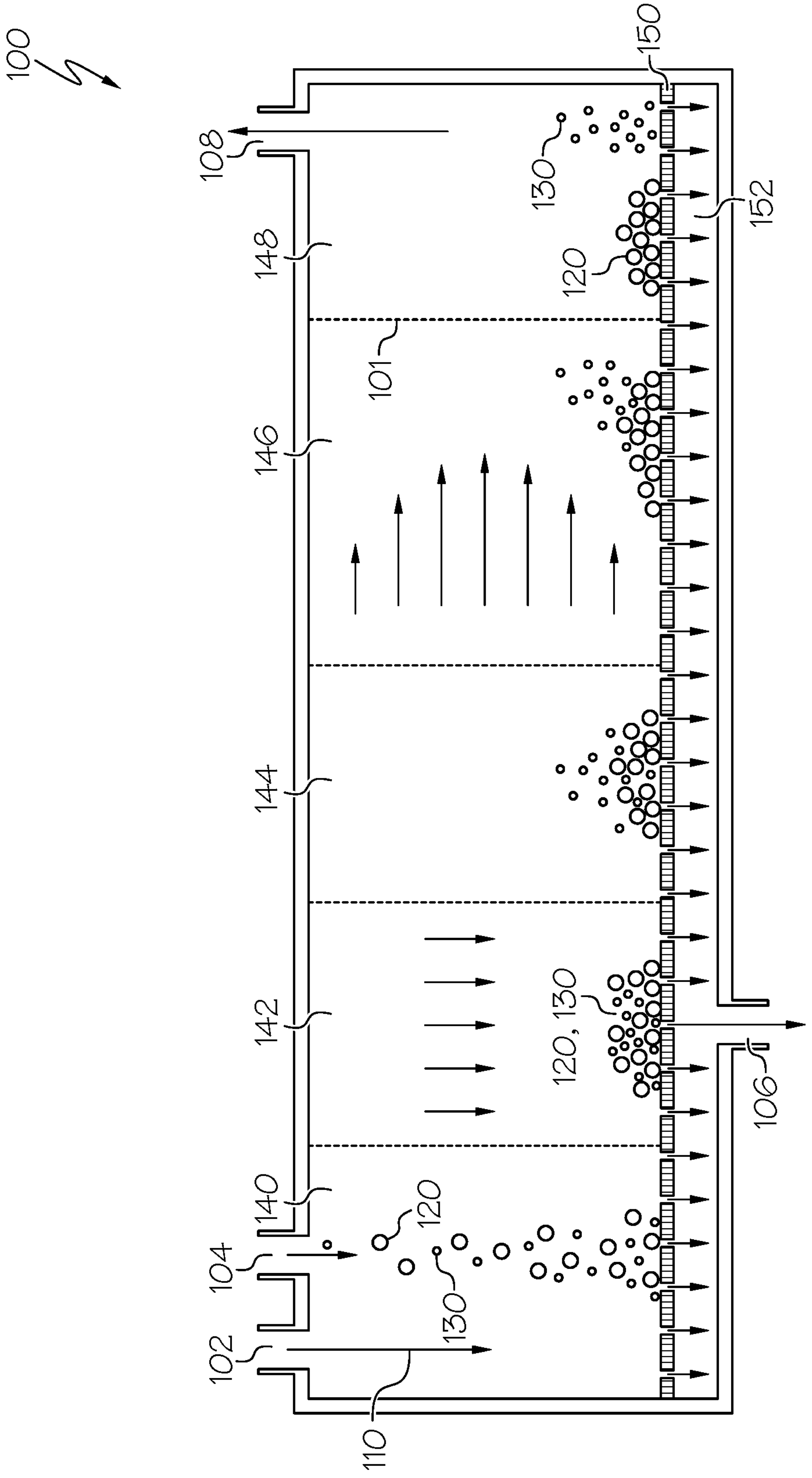
FIG. 1 (PRIOR ART)
FIG. 1 depicts a schematic side view of a prior art field flow fractionator.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

Definitions

Particle

A particle may be a constituent of a liquid sample aliquot. Such particles may be molecules of varying types and sizes, nanoparticles, virus like particles, liposomes, emulsions, bacteria, and colloids. These particles may range in size on the order of nanometer to microns.

Analysis of Macromolecular or Particle Species in Solution

The analysis of macromolecular or particle species in solution may be achieved by preparing a sample in an appropriate solvent and then injecting an aliquot thereof into a separation system such as a liquid chromatography (LC) column or field flow fractionation (FFF) channel where the different species of particles contained within the sample are separated into their various constituencies. Once separated, generally based on size, mass, or column affinity, the samples may be subjected to analysis by means of light scattering, refractive index, ultraviolet absorption, electrophoretic mobility, and viscometric response.

Field Flow Fractionation (FFF)

The separation of particles in a solution by means of field flow fractionation, FFF, was studied and developed extensively by J. C. Giddings beginning in the early 1960s. The basis of these techniques lies in the interaction of a channel-constrained sample and an impressed field applied perpendicular to the direction of flow. Among those techniques of current interest is cross flow FFF, often called symmetric flow (SFlFFF), where an impressed field is achieved by introducing a secondary flow perpendicular to the sample borne fluid within the channel. There are several variations of this technique including asymmetric flow FFF (i.e., A4F), and hollow fiber (H4F) flow separation.

Other FFF techniques include (i) sedimentation FFF (SdFFF), where a gravitational/centrifugal cross force is applied perpendicular to the direction of the channel flow, (ii) electrical FFF (EFFF), where an electric field is applied perpendicular to the channel flow, and (ii) thermal FFF (ThFFF), where a temperature gradient is transversely applied.

Common to all these methods of field flow fractionation is a fluid, or mobile phase, into which is injected an aliquot of a sample whose separation into its constituent fractions is achieved by the application of a cross field. Many of the field flow fractionators allow for the control and variation of the strength of the cross field during the time the sample aliquot flows down the channel, be it electrical field, cross flow, thermal gradient, or other variable field.

Overview

Field flow fractionators are primarily used for analytical separations. In the typical application, an aliquot of a polydisperse sample is injected into the channel and after time, the individual fractions elute separated in time. The typical injection quantities are milligrams of sample. It is common to collect the fractions in vials and one can make several runs in order to increase the quantity of the fractionated material in each vial. However, the method is inherently batch: Inject, Fractionate, Analyze, and Collect.

Known analytical FFF methods do not scale well to preparative applications that require gram or kilogram quantities. Present embodiments described herein seek to rectify these deficiencies, and provide FFF methods and fractionators which can operate continuously and at much higher quantities than prior known methods. There are many applications where preparative applications on larger scales would be desirable. For example, present embodiments described herein may be deployed to use FFF to generate gram quantities of fractionated material in order to prepare therapeutic doses of a drug product. Alternatively, present embodiments may be utilized to purify bio-nanoparticles into fractions with a narrow size or charge range that are characterized by other methods that require large amounts of material. A third application of embodiments disclosed herein may be to polish a large sample to remove small molecules (e.g., impurities), and/or large aggregates.

Using known analytical FFF methods and systems, such applications would require an array of many fractionators and be prohibitively expensive and unwieldy. The present embodiments described herein seek to provide a device that can operate in a continuous fractionation mode into which one supplies a feed of sample and recovers the sample from two or more ports that output different sub-fractions. In this mode, the amount of fractionated sample increases over time and can thereby accumulate large quantities of product. Providing FFF systems and methods to run in a contiguous fractionation mode is the subject of the present disclosure.

Thus, disclosed are various methods using FFF for operating in a continuous fraction mode. Such a mode can process much larger quantities of sample and may be scalable to address preparative fraction needs.

In the disclosed continuous FFF based fractionators, the basic mechanism is the interplay between a field that drives the sub-fractions of a sample towards an accumulation wall, and diffusion that lifts the sub-fractions off the wall and gives rise to differing exponential concentration decays as a function of distance from the accumulation wall. Moreover, present embodiments disclosed herein utilize orthogonal cross flows to further separate sub-fractions for extraction by different outlet ports. Still further, embodiments herein disclose providing a "hold" port to further facilitate the creation of an accumulation region to create a cycled approach to continued fractionation.

Field Flow Fractionation and Diffusion

FIG. 1 depicts a schematic side view of a prior art field flow fractionator 100. Specifically, the FFF 100 includes a channel 101 having a frit inlet port 102, a sample inject port 104, a cross-flow port 106, and a fraction output port 108. In the example embodiment, the channel 101 may be between 250 and 900 μm in height, and may have an appropriate channel length to provide enough distance for FFF separation to occur.

As shown, an unseparated sample 110 is provided into the channel 101 of the FFF 100. The unseparated sample 110 includes a sample having multiple constituent parts—for example comprising large sized particles 120 and small sized particles 130. The bottom of the channel 101 includes a membrane 150 configured to prevent sample from moving therethrough, and a porous frit 152 located below the membrane 150 between the membrane 150 and the cross-flow port 106 configured to allow solvent to outlet from the channel 101 through the cross flow port 106.

In this example, the frit inlet port 102 provides solvent into the channel 101 which pushes the unseparated sample

120, 130 coming from the sample inject port 104 toward the membrane 150 at an inlet section 140 of the channel 101. Downward fluidic pressure toward the membrane is caused by the combination of the inlets 102, 104, and the cross-flow port 106. In a cross-flow section 142, the unseparated sample 120, 130 begins to congregate toward the membrane 150. Slowly, the unseparated sample 120, 130 moves rightward along the channel 101 toward the sample output port 108.

As the unseparated sample 120, 130 moves away from the cross-flow port 106, diffusion occurs in a diffusion section 144 followed by a parabolic channel flow section 146. During these sections, the large particles 120 experience high Stokes forces toward the wall and are lifted upward by relatively weak diffusion flux. In contrast, small particles experience a relatively weak Stokes force downward and a high diffusion force upwards. Each sample sub-fraction has its highest concentration on the accumulation wall, and concentration falls exponentially with distance from the wall. The exponential decay length of the small particles is therefore larger than the exponential decay length of the large particles.

As a result of the above-described principles, the small particles are more diffusive and reach the end of the channel 101 first. In particular, the channel 101 includes a separated sample section 148, which the separated small particles 130 reach first, followed by the separated large particles 120. Once the sample reaches the end of the channel 101, the separated particles are pulled out of the channel 101 through the sample output port 108.

Example Embodiments

Figure 2A:
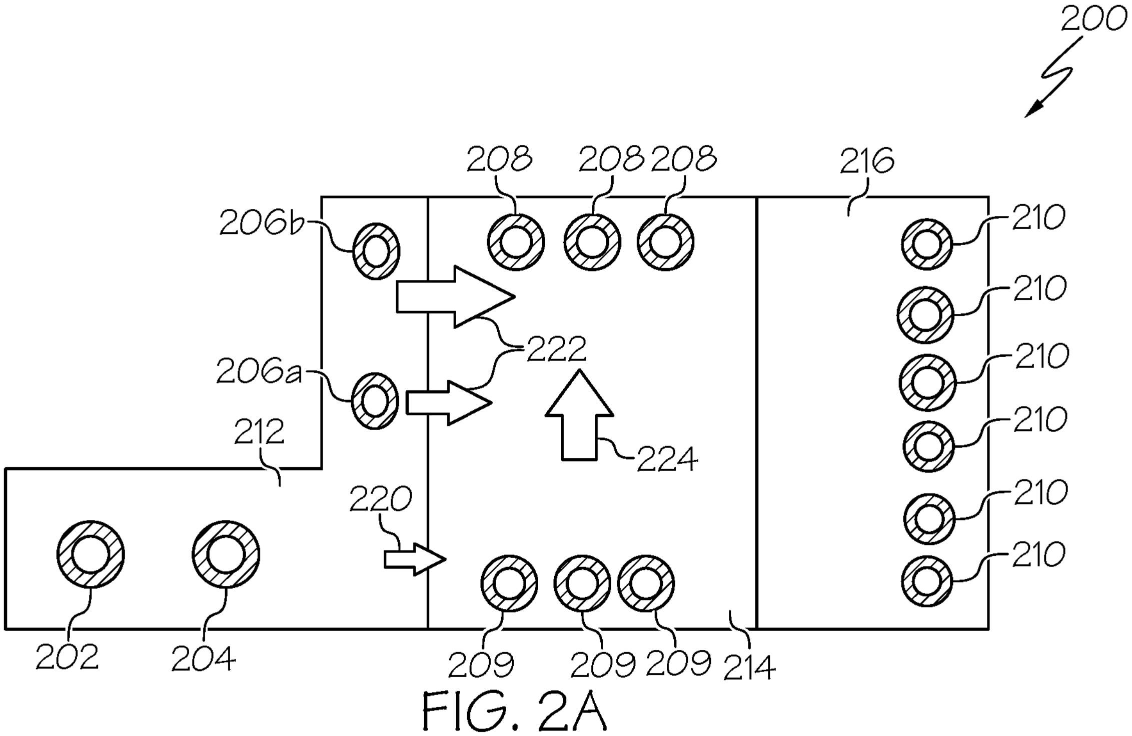
FIG. 2A depicts a schematic side view of a continuous field flow fractionator, in accordance with one embodiment.

FIG. 2A depicts a schematic top view of a continuous field flow fractionator (CFFF) 200, in accordance with one embodiment. The CFFF 200 is shown comprising a channel structure which can be fluid filled and defined between a top plate assembly and a bottom plate assembly (not shown). The channel structure can be defined by a separate spacer which defines the channel height and side walls which may extend into and/or out of the view shown in FIG. 2A. This separate spacer may alternatively be an integral part of either the top or bottom plate assembly. Whatever the embodiment, the channel structure may have a defined channel height, and side walls defining the shape shown in FIG. 2A. However, other channel shapes are contemplated.

The CFFF 200 is shown including an inlet port 202, an inject port 204, two channel flow gradient ports 206*a*, 206*b*, a plurality of orthogonal flow outlet ports 208, a plurality of orthogonal flow inlet ports 209, and a plurality of sample outlet ports 210. However, the present embodiment is exemplary, and the number of the various ports may be changed without departing from the scope of the concepts described herein. For example, a single orthogonal flow inlet port and corresponding outlet flow outlet port may be deployed. Further, the number of sample outlet ports may be two or more. Moreover, the channel flow gradient ports 206*a*, 206*b* may be optional ports to provide further channel flow from the sample inject port 204 to the sample outlet ports 210.

The inject port 204, the inlet port 202, the channel flow gradient ports 206*a*, 206*b*, and the orthogonal flow inlet ports 209 may each be configured to be turned on and turned off. In an on state, the inject port 204 may be configured to provide sample to the channel structure. In an on state, the inlet port 202, the channel flow gradient ports 206*a*, 206*b*, and the orthogonal flow inlet ports 209 may each be configured to provide a solvent flow to the channel in the direction shown. In an off state, these ports 202, 204, 206*a*, 206*b*, 209 may instead provide no flow to the channel structure.

The various port features, such as the inject port 204, the inlet port 202, the channel flow gradient ports 206*a*, 206*b*, the orthogonal flow ports 208, 209, and the sample outlet ports 210, may be each included as structure of the top plate assembly, for example. However, in some embodiments, the CFFF 200 may have some ports, such as the orthogonal flow ports 208, 209, located in a separate spacer located between the top plate assembly and the bottom plate assembly. Still further, while not shown, the membrane may be located at a bottom of the channel proximate the bottom plate assembly. A bottom cross-flow port (such as the cross-flow port 106) may be provided (not shown) beneath the membrane in order to create a cross flow within the channel structure. The CFFF 200 may include an inlet and inject region 212, an orthogonal flow region 214, and an outlet region 216.

In operation, various flows are created within the channel structure of the CFFF 200, including a channel flow from the inlet port 202 to the sample outlet ports 210 in an X-direction (from left to right in FIG. 2A). In particular, the inlet port 202 and the inject port 204 create a first channel flow 220, while additional channel flow gradient ports 206*a*, 206*b* create additional channel flows 222. At least one orthogonal flow 224 is further created by the orthogonal flow outlet ports 208 and the plurality of orthogonal flow inlet ports 209. The orthogonal flow 224 may be limited to the orthogonal flow region 214 of the channel structure and may occur in a Y-direction (from bottom to top in FIG. 2A). Further, a cross-flow may be provided to hold the particles against the membrane located at the bottom of the channel structure. The cross-flow may be a flow defined in a Z-direction, perpendicular to the X and Y directions (into the page in FIG. 2A).

A solvent flowing from the orthogonal flow inlet ports 209 to the orthogonal flow outlet ports 208 defines the orthogonal flow region 214. In this orthogonal flow region 214, the solvent flowing from the orthogonal flow inlet ports 209 impinges on particles of a sample flowing between the inject port 204 and the sample outlet ports 210 while the sample flows through the orthogonal flow region 214.

From the orthogonal flow region 214, particles of the sample flow to the sample outlet ports 210 according to sizes of the particles of the sample, resulting in fractions of the sample in accordance with the sizes of the particles. In particular, smaller particles may be impacted greater by the orthogonal flow 224 within the orthogonal flow region 214.

Figure 2B:
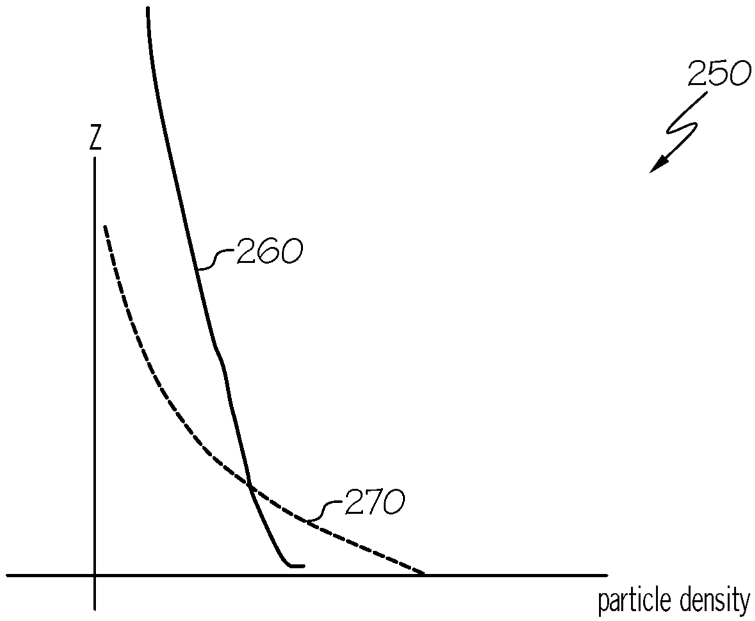
FIG. 2B depicts a particle density distribution graph, in accordance with one embodiment.

FIG. 2B depicts a particle density distribution graph, in accordance with one embodiment. The cross-flow holds particles against the bottom membrane and is countered by diffusion, which leads to a particle density distribution in the Z-direction (into or out of the page) along a height of the channel structure. Specifically, particle density as it relates to diffusion is plotted in graph 250. A first plot 270 includes particles having a small hydraulic resistance (Rh), while a second plot 260 includes particles having a high hydraulic resistance (Rh). As a result of this, larger particles are generally held more closely against the membrane, where (due to Pouseille flow), flow velocity in x and y is lowest. As a result, they move more slowly than small particles do in the direction of fluid flow.

Figure 3A:
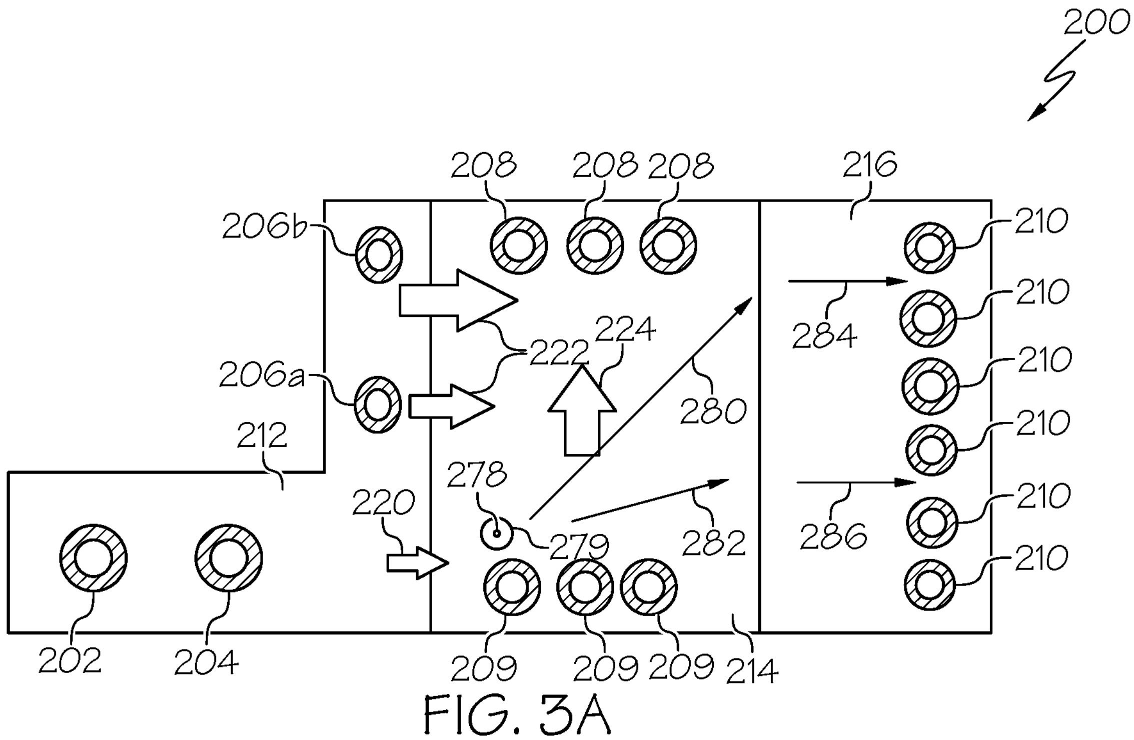
FIG. 3A depicts a schematic side view of the continuous field flow fractionator of FIG. 2A, showing a flow distribution pattern, in accordance with one embodiment.

FIG. 3A depicts a schematic top view of the CFFF 200 of FIG. 2A, showing a flow distribution pattern of a small particle 278 and a large particle 279, in accordance with one embodiment. As shown in FIG. 2A, this flow distribution pattern leads to a small particle path 280 moving through the orthogonal flow region 214, followed by a channel flow path 284 to a top sample outlet port 210. Thus, the small particle 278 is distributed further in the Y-direction. Further, this process may lead to a large particle path 282 through the orthogonal flow region 214, followed by a channel flow path 286 to a lower sample outlet port 210. The large particle 279 does not move as far in the Y-direction as a result of less orthogonal dispersion.

Figure 3B:
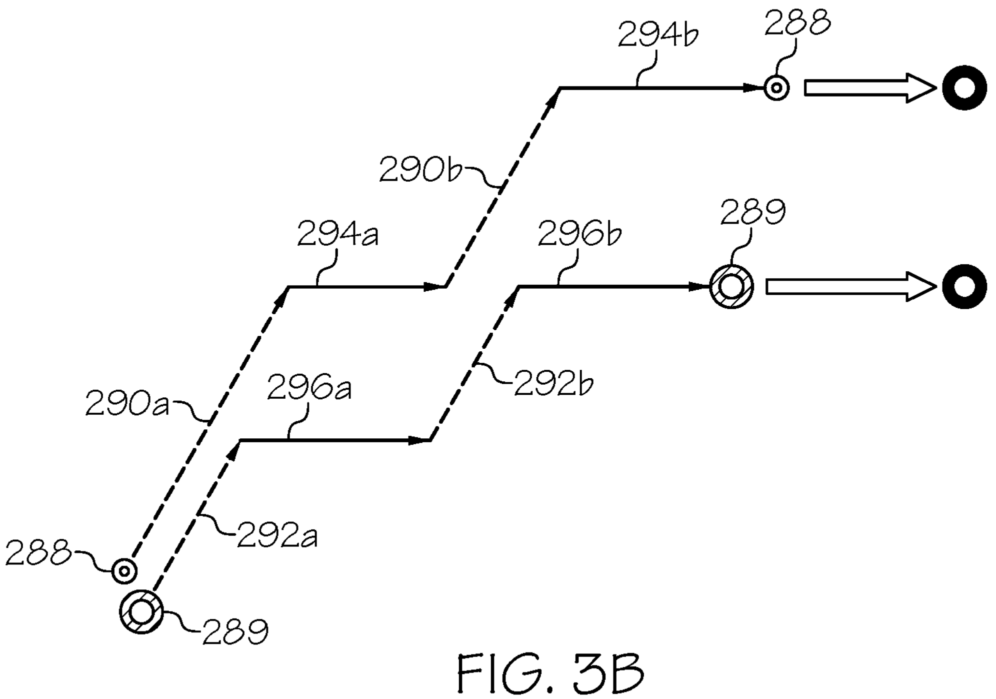
FIG. 3B depicts a schematic representation of the flow of two particles through the continuous field flow fractionator of FIGS. 2A and 3A, in accordance with one embodiment.

FIG. 3B depicts a schematic representation of the flow of two particles through the field flow fractionator of FIGS. 2A and 3A, in accordance with one embodiment. In particular, FIG. 3B shows a multi-step process may be implemented by the CFFF 200 to aid in separating particles by size into the different outlet ports 210.

In a first phase characterized by a flow 290*a* for a small particle 288 and flow 292*a* for a large particle 289, the orthogonal flow is on, the channel flow is on, and the cross-flow is on. In this phase 290*a*, 292*a*, the particles 288, 289 may be in an equilibrium position in the Z-axis (i.e., at an unchanging height within the channel structure). However, the particles 288, 289 may move diagonally in the phases 290*a*, 292*a* at a speed inversely proportional to size, whereby the small particle 288 moves further than the large particle 289. However, both particles 288, 289 travel in the same general diagonal direction, which is the sum of the orthogonal flow and channel flow.

In a second phase, defined by flow 294*a* for the small particle 288 and flow 296*a* for the large particle 289, a disruption of equilibrium distribution occurs for the particles 288, 289. Here, the orthogonal flow may be turned off in order to disrupt equilibrium particle positions. However, the particles positions may be disrupted in the Z-axis, as the particles may move up by a constant height in the second phase. While no orthogonal flow may occur in the second phase, other mechanisms may be deployed to help shift particles upward within the channel structure, such as ultrasound, a piezo-driven piston, diffusion, thermal convection, or the like.

Figure 4A:
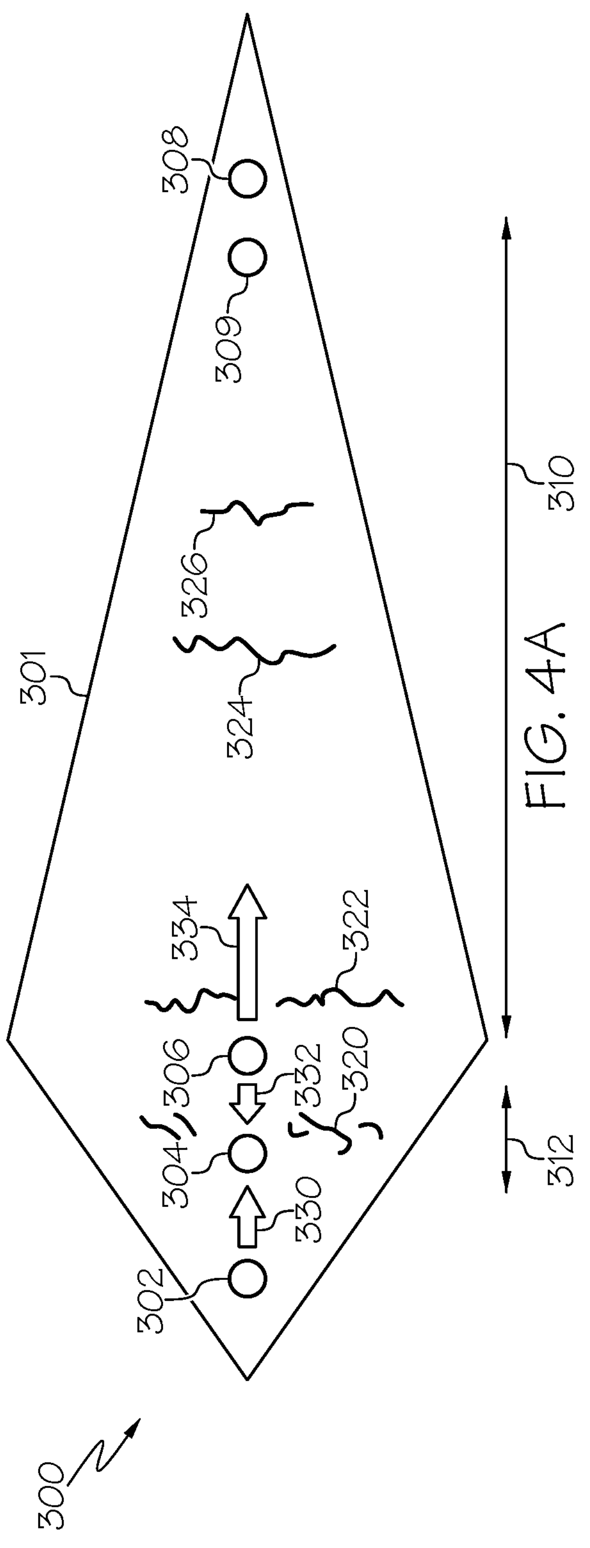
FIG. 4A depicts a schematic top view of a continuous field flow fractionator, in accordance with one embodiment.

FIG. 4A depicts a schematic top view of a continuous field flow fractionator (CFFF) 300, in accordance with one embodiment. In this embodiment, the channel is 301 is a fluid filled region defined by an inlet port 302, an inject port 304, a hold port 306, a sample outlet port 308, and a solvent outlet port 309.

The hold port 306 is located closer to the sample outlet port 308 than the inject port 304 and the inlet port 302. An accumulation region 312 is located between the hold port 306 and at least one of the inlet port 302 and the inject port 304. A separation region 310 is defined between the hold port and the sample outlet port.

The top view of the channel structure shown in FIG. 4A shows a specific kite shaped quadrilateral profile. This profile is exemplary and other channel structures may be used with the embodiment described. Moreover, the CFFF 300 may optionally include the solvent outlet port 309 proximate but up-channel from the sample outlet 308. The solvent outlet port 309 may be configured to extract sample-free solvent and may further help to increase the concentration of sample provided to the sample outlet 308.

Figure 4B:
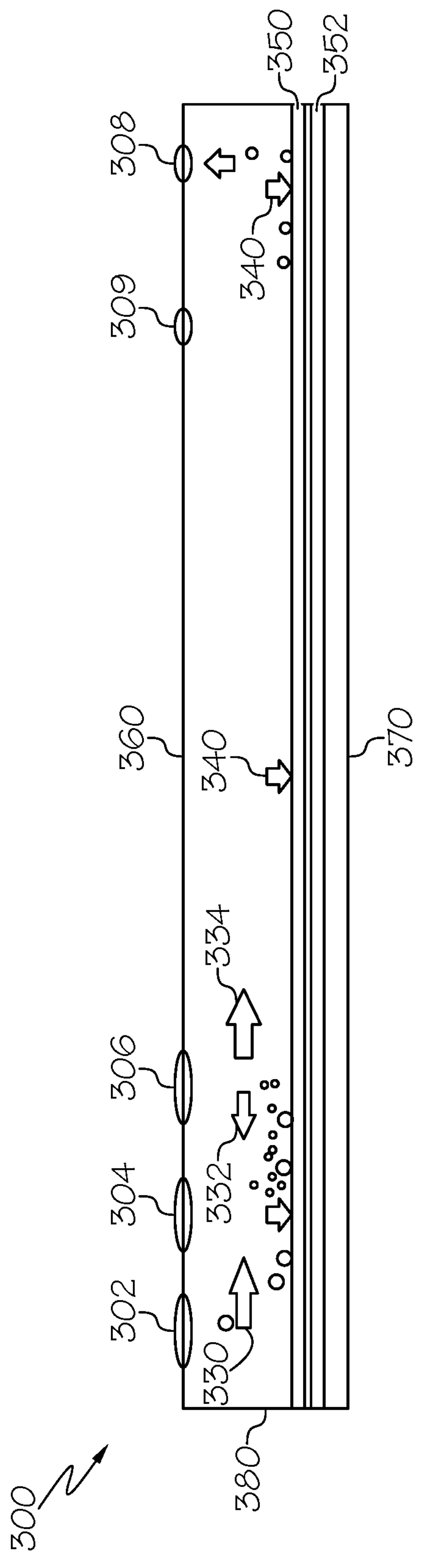
FIG. 4B depicts a schematic side view of the continuous field flow fractionator of FIG. 4A, in accordance with one embodiment.

FIG. 4B depicts a schematic side view of the CFFF 300 of FIG. 4A, in accordance with one embodiment. As shown, the CFFF 300 includes a top plate assembly 360 and a bottom plate assembly 370, and a membrane 350 spanning a length of the separation channel. The CFFF 300 further includes a spacer 380 located between the top plate assembly 360 and the membrane 350. A frit 352 is located between the membrane 350 and the bottom plate assembly 370. While not shown, the bottom plate assembly may include a solvent cross-flow outlet in order to provide a downward cross-flow 340 within the channel structure 301.

A particularly unique feature of the CFFF 300 is the hold port 306. In operation, the hold port 306 may provide a flow of solvent which focuses sample 322 within the accumulator region 312 when the hold port 306 is in an "on" state. Further, the hold port 306, when on, drives the channel flow within the separation region 310 for sample 322 which has already proceeded down-channel past the hold port 306 when the hold port 306 is turned on. Thus, during the hold phase where the hold port 306 is turned on, solvent flowing from the inlet port 302 via a flow 330, sample flowing from the inject port 304, and solvent flowing from the hold port 306 via a flow 332 define the accumulation region 312. In particular, solvent flowing from the hold port 306 impinges on particles of the sample flowing from the inject port 304, such that a set 320 of the particles flows back toward the accumulation region 312. A remainder 322 of the particles flow toward the sample outlet port 308. In the embodiment contemplated, the solvent flowing from the inlet port 302 may always be "on", as well as the sample injected from the inject port 304 may also always be continuously injected.

When the hold port 306 is then turned off during a transfer phase, a subset and/or all of the set 320 of particles in the accumulation region 312 may then be able to flow toward the sample outlet port 308, such that during a subsequent hold phase, the subset of particles elutes through the sample outlet port 308, resulting in at least one fraction 324, 326 of the sample for a cycle corresponding to each of the hold phase and the transfer phase. In other words, whatever portion of sample flows down-channel past the hold port 306 during the transfer phase is then separated into fractions 324, 326 as the sample continues to move down the separation region 310 toward the sample outlet port 308.

Figure 5:
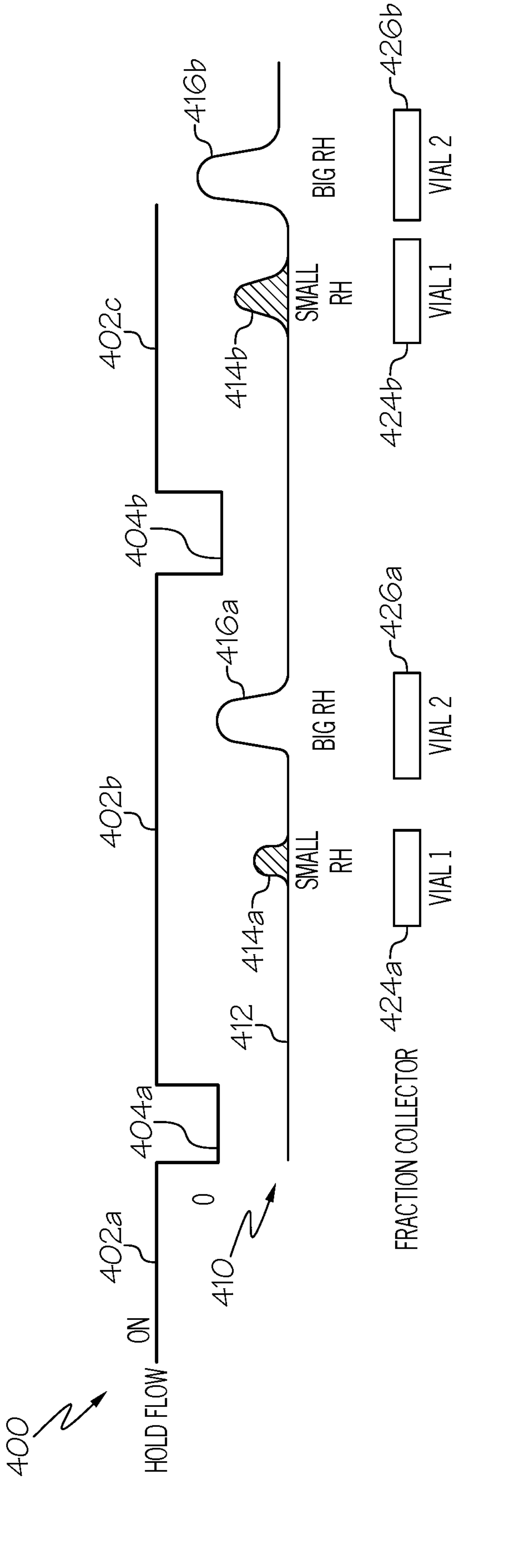
FIG. 5 depicts schematic graph of flow over time of a hold flow and particle flow, in accordance with one embodiment.

FIG. 5 depicts schematic graph of flow over time of a hold flow and particle flow, in accordance with one embodiment. As shown, a hold flow plot over time 400 alternates between a hold phases 402*a*, 402*b*, 402*c* where the hold port 306 is on, and transfer phases 404*a*, 404*b* where the hold port 306 is off. As a result, a detector result 410 is shown as a plot 412 over time whereby cycles of detection are visible. In particular, small particles 414*a*, 414*b* may be detected, as well as large particles 414*a*, 414*b* successively, and in cycles over time. As shown, a fraction collector may be used to collect sample vials 424*a*, 426*a*, and sample vials 424*b*, 426*b* continuously over time.

In one example, if the small particles are known to elute in four minutes and the large particles elute in five minutes, the cycle may be determined to be greater than one minute (i.e., the difference between the known elution timings of the different fractions of the sample). Thus, the hold phase time may be at least the difference in known elution timings of the different fractions of the sample.

Figure 6A:
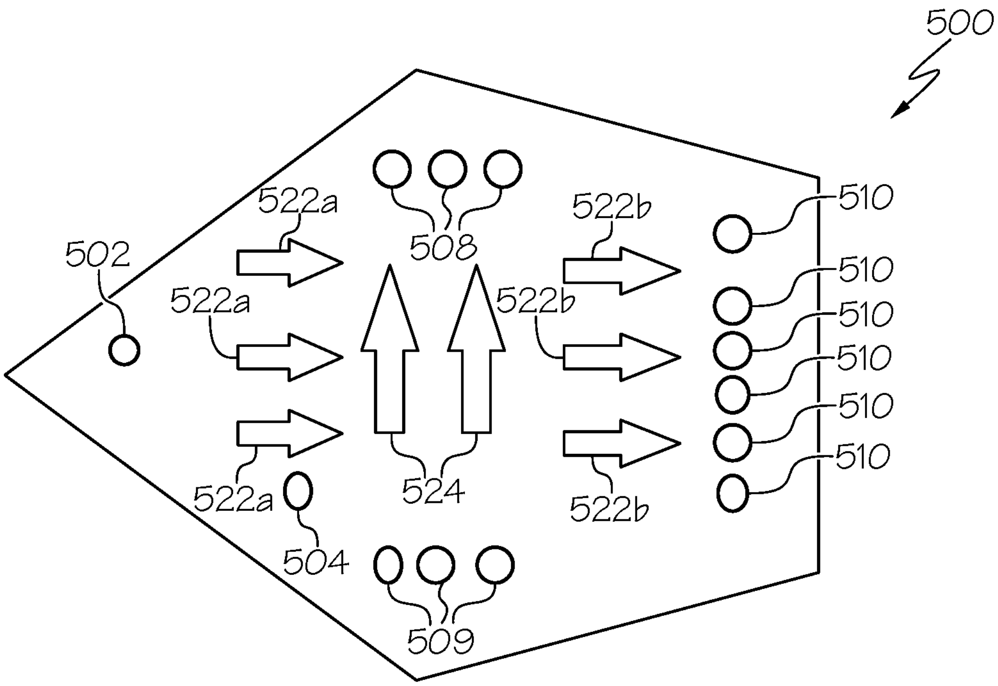
FIG. 6A depicts a schematic top view of a further continuous field flow fractionator, in accordance with one embodiment.

FIG. 6A depicts a schematic top view of a further continuous field flow fractionator (CFFF) 500, in accordance with one embodiment. The CFFF 500 is shown comprising a channel structure which can be fluid filled and defined between a top plate assembly and a bottom plate assembly (not shown). The channel structure can be defined by a separate spacer which defines the channel height and side walls which may extend into and/or out of the view shown in FIG. 6A. This separate spacer may alternatively be an integral part of either the top or bottom plate assembly. Whatever the embodiment, the channel structure may have a defined channel height, and side walls defining the shape shown in FIG. 6A. However, other channel shapes are contemplated.

The CFFF 500 is shown including an inlet port 502, an inject port 504, a plurality of orthogonal flow outlet ports 508, a plurality of orthogonal flow inlet ports 509, and a plurality of sample outlet ports 510. However, the present embodiment is exemplary, and the number of the various ports may be changed without departing from the scope of the concepts described herein. For example, a single orthogonal flow inlet port and corresponding outlet orthogonal flow outlet port may be deployed. Further, the number of sample outlet ports may be two or more.

The inject port 504, the inlet port 502, and the orthogonal flow inlet ports 509 may each be configured to be turned on and turned off. In an on state, the inject port 504 may be configured to provide sample to the channel structure. In an on state, the inlet port 502, and the orthogonal flow inlet ports 509 may each be configured to provide a solvent flow to the channel in the direction shown. In an off state, these ports 502, 504, 509 may instead provide no flow to the channel structure.

The various port features, such as the inject port 504, the inlet port 502, the orthogonal flow ports 508, 509, and the sample outlet ports 510, may be each included as structure of the top plate assembly, for example. However, in some embodiments, the CFFF 500 may have some ports, such as the orthogonal flow ports 208, 209, located in a separate spacer located between the top plate assembly and the bottom plate assembly.

Figure 6B:
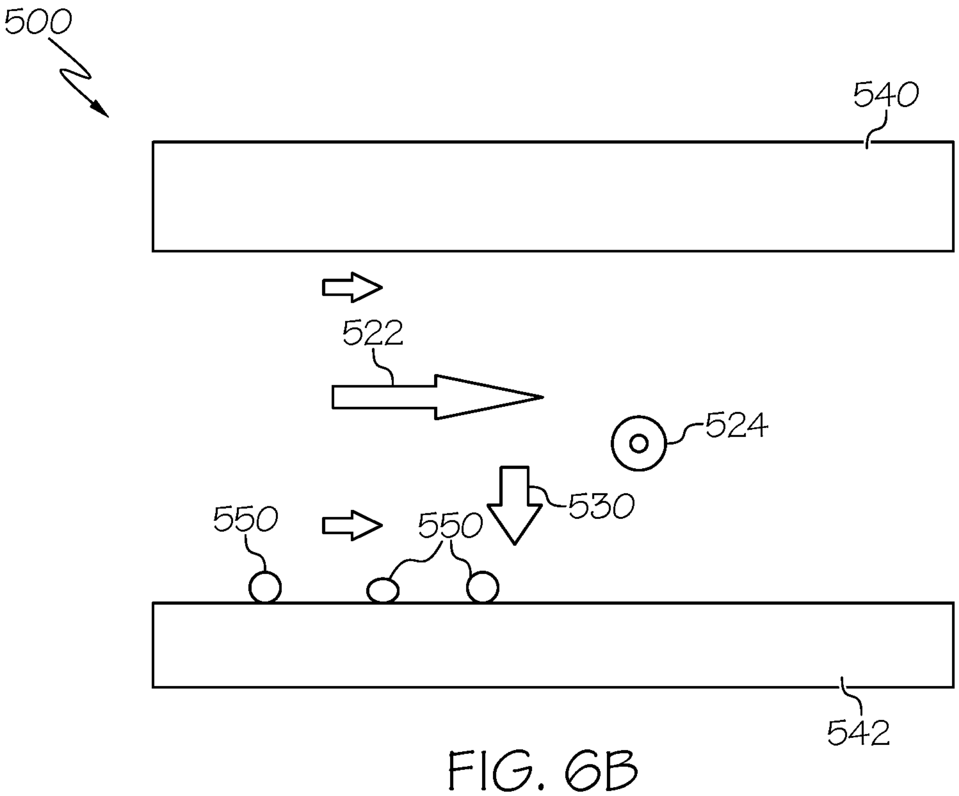
FIG. 6B depicts a schematic side view of the continuous field flow fractionator of FIG. 6A, in accordance with one embodiment.

FIG. 6B depicts a schematic side view of the CFFF 500 of FIG. 6A, in accordance with one embodiment. As shown, the CFFF 500 may include a top membrane 540 and a bottom membrane 542. The top membrane 540 may be located at a top of the channel structure proximate the top plate assembly, and the bottom membrane 542 may be located at a bottom of the channel proximate the bottom plate assembly. While not shown, the CFFF 500 may include at least one bottom cross-flow port (such as the cross-flow port 106) beneath the bottom membrane 542 in order to create a downward cross-flow 530 within the channel structure. Similarly, at least one top cross-flow port (not shown) may be located above the top membrane 540 in order to create an upward cross-flow within the channel structure. The cross-flow ports may be configured to create a negative fluidic pressure and pull solvent through the respective membranes and out of the channel.

In operation, various flows are created within the channel structure of the CFFF 500, including a channel flow 522*a* from the inlet port 502 to the sample outlet ports 510 in an X-direction (from left to right in FIG. 6A). At least one orthogonal flow 524 is further created by the orthogonal flow inlet ports 509 and the plurality of orthogonal flow outlet ports 508. The orthogonal flow 524 may be limited to an orthogonal flow region of the channel structure and may occur in a Y-direction (from bottom to top in FIG. 6A). Further, a bottom cross-flow may be provided to hold the particles 550 against the bottom membrane 542 located at the bottom of the channel structure. The cross-flow may be a flow defined in a Z-direction, perpendicular to the X and Y directions (into the page in FIG. 2A). Similarly, a top cross-flow may be provided to hold the particles against the top membrane 540 located at the top of the channel structure.

As shown, the particles 550 may flow to the plurality of sample outlet ports 510 according to sizes of the particles, resulting in fractions of the sample in accordance with the sizes. In particular, smaller particles may be impacted greater by the orthogonal flow 524 and the upward and downward cross flows 530.

Figure 7A:
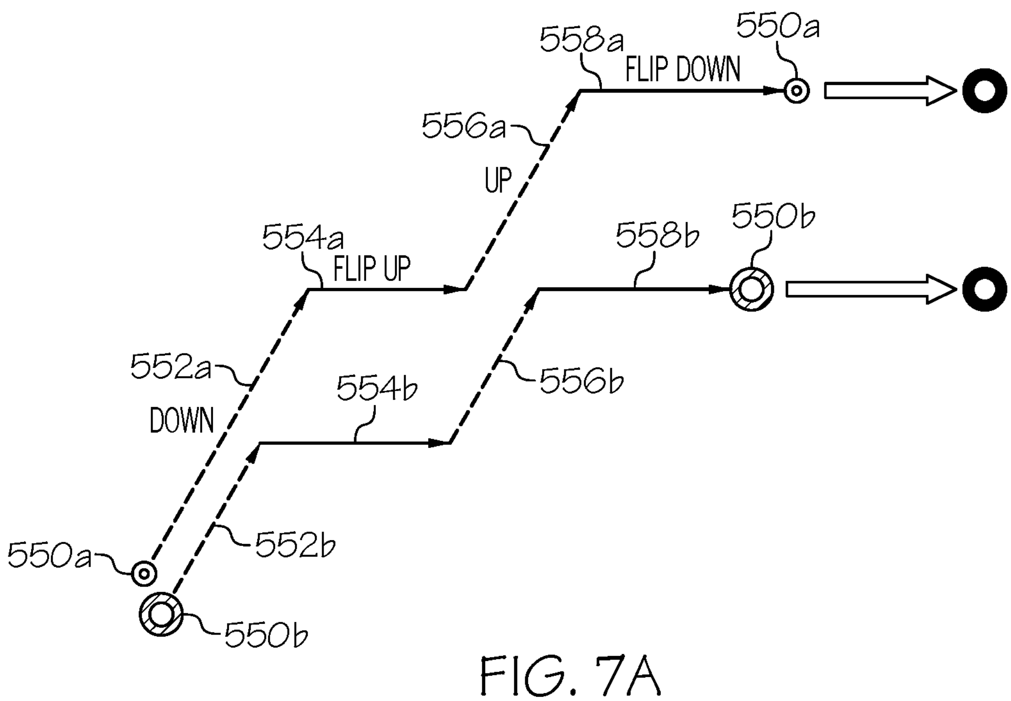
FIG. 7A depicts a schematic representation of the flow of two particles through the continuous field flow fractionator of FIG. 6A, in accordance with one embodiment.

FIG. 7A depicts a schematic representation of the flow of two particles 550*a*, 550*b* through the continuous field flow fractionator of FIG. 6A, in accordance with one embodiment. In particular, FIG. 7A shows a multi-step process may be implemented by the CFFF 500 to aid in separating particles by size into the different sample outlet ports 510.

In a first phase characterized by a flow 552*a* for a small particle 550*a* and flow 552*b* for a large particle 550*b*. Here, the cross-flow may be in a "down state" whereby the bottom cross flow pushes the particles toward the bottom membrane 542. Here, the particles collect near the bottom membrane. The orthogonal flow is on, the channel flow is on, and this bottom cross flow is on. In this phase 552*a*, 552*b*, the particles 550*a*, 550*b* collect near the bottom membrane 542.

During a second "flip up" state, the cross-flow direction is reversed, whereby the bottom cross-flow turns off and the top cross-flow turns on. During this phase, the orthogonal flow 524 may be turned off. The particles 550*a*, 550*b* may move through the center of the channel with respective flows 554*a*, 554*b*, where they feel the full effect of the channel flow 522 pushing them toward the outlet ports 510. While crossing the channel, particles 550*a*, 550*b* move at a velocity independent of size. The system proceeds to the "up" state once particles have reached an equilibrium position at the top membrane 540.

In a third phase characterized as an "up" state, the "top cross-flow" 531 (shown in FIG. 7C) pushes particles 550*a*, 550*b* towards the top membrane 540. Here, the particles 550*a*, 550*b* collect near the top membrane 540. During this phase, the channel flow 522 is on, and the orthogonal flow 524 is on. The combination of channel and orthogonal flows 522, 524 push the particles 550*a*, 550*b* diagonally, at a velocity inversely proportional to size, via flows 556*a*, 556*b*, respectively.

In a fourth phase characterized as a "flip down" state, this state is similar as the "flip up state" except that the top cross-flow is turned off and the bottom cross-flow is turned on. Here, the particles 550*a*, 550*b* may move through the center of the channel with respective flows 558*a*, 558*b*, where they feel the full effect of the channel flow 522 pushing them toward the sample outlet ports 510.

Figure 7B:
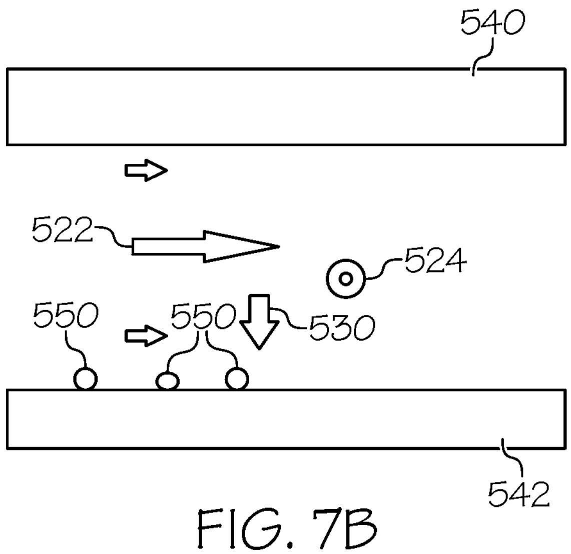
FIGS. 7B, 7C and 7D depicts schematic side representations of the flow of particles through the continuous field flow fractionator of FIG. 6A in various flow states, in accordance with one embodiment.
Figure 7C:
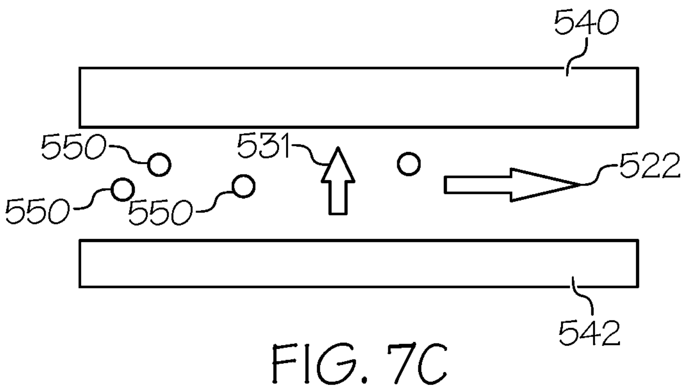

FIG. 7B depicts schematic side representations of the flow of particles through the continuous field flow fractionator of FIG. 6A in various flow states, in accordance with one embodiment.

During a down state, the top panel, FIG. 7B, shows solvent flowing toward the bottom cross-flow port impinges on particles 550 of sample flowing from the inlet port 502 thereby pinning the particles 550 onto the bottom membrane 542. At the same time, solvent from the at least one orthogonal flow inlet port 509 impinges on the particles 550, resulting in the particles 550 flowing toward the at least two sample outlet ports 510 at a height above the bottom membrane 542 according to sizes of the particles.

After the down state and during a switching state, the middle panel shows solvent flowing toward the bottom cross flow port impinging on particles of sample flowing from the inlet port, resulting in the particles flowing toward the at least two sample outlet ports at a height above the bottom membrane 542 according to sizes of the particles.

Figure 7D:
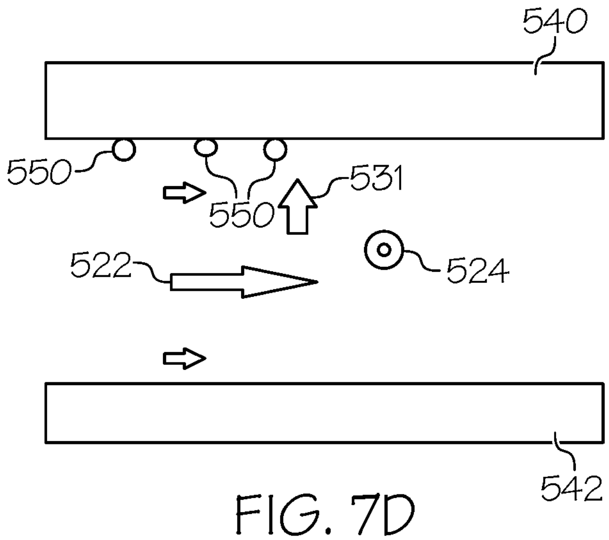

During an up state, the bottom panel, FIG. 7D shows, solvent flowing toward the top cross-flow port impinges on particles of sample flowing from the inlet port thereby pinning the particles 550 onto the top membrane 540, solvent from the at least one orthogonal flow inlet port impinges on the particles 550, resulting in the particles 550 flowing toward the at least two sample outlet ports at a height below the top membrane 540 according to sizes of the particles 550.

Methodology

Various methods are contemplated for performing continuous FFF separation. These methods may be implemented by executing a set of logical operations by a computer system, or with the controlling operations of a computer system (such as the computer system 800 shown in FIG. 8 and described below) in order to achieve the functionality and/or control the FFFs to produce the functionality described in the methods. Thus, the methods may be performable by one or more of the example embodiments of the continuous FFFs described herein above and shown in FIGS. 2A-7B.

Methods include, for example, executing, by a computer system, a set of logical operations injecting a sample in a continuous flow into a sample inject port of a continuous field flow fractionator (CFFF) such as the CFFF 200, 300, 500.

For example, methods may include executing, by a computer system, a set of logical operations to perform the functionality shown in FIGS. 2A-3B. In particular, methods may include executing, by the computer system, a set of logical operations injecting a continuous flow of pure solvent into a frit inlet port, such as one of the ports 202, 302, 502, described herein above, of the CFFF sufficient to force the sample toward a membrane of the CFFF. Methods may include executing, by the computer system, a set of logical operations for causing solvent flowing from the inlet port to impinge on particles of a sample flowing between the inject port to the at least two sample outlet ports in an orthogonal flow region. Methods may further include executing, by the computer system, a set of logical operations for the particles of the sample to flow to the at least two sample outlet ports according to sizes of the particles of the sample, resulting in fractions of the sample in accordance with the sizes of the particles.

Further, methods may include executing, by a computer system, a set of logical operations to perform the functionality shown in FIGS. 4A-5. Such methods may include executing, by a computer system, a set of logical operations to create a hold phase whereby solvent flowing from the inlet port, sample flowing from the inject port, and solvent flowing from the hold port define an accumulation region and solvent flowing from a hold port impinges on particles of the sample flowing from the inject port. Methods may also include executing, by a computer system, a set of logical operations to cause a set of the particles to flow back toward the accumulation region and a remainder of the particles flow toward the sample outlet port. Methods may also include executing, by a computer system, a set of logical operations to create a transfer phase in a channel whereby a subset of the set of particles flows toward the sample outlet port such that during a subsequent hold phase, the subset of particles elutes through the sample outlet port, resulting in at least one fraction of the sample for a cycle corresponding to each of the hold phase and the transfer phase.

Methods may also include executing, by a computer system, a set of logical operations to create the switching states described in FIGS. 6A-7D. In particular, methods may also include executing, by a computer system, a set of logical operations to create a down state, whereby solvent flowing toward the bottom cross-flow port impinges on particles of sample flowing from the inlet port thereby pining the particles onto the bottom membrane, solvent from the at least one orthogonal flow inlet port impinges on the particles, resulting in the particles flowing toward the at least two sample outlet ports at a height above the bottom membrane according to sizes of the particles.

Methods may also include executing, by a computer system, a set of logical operations to create a switching state, whereby solvent flowing toward the bottom cross flow port impinges on particles of sample flowing from the inlet port, resulting in the particles flowing toward the at least two sample outlet ports at a height above the bottom membrane according to sizes of the particles.

Methods may also include executing, by a computer system, a set of logical operations to create an up state whereby solvent flowing toward the top cross-flow port impinges on particles of sample flowing from the inlet port thereby pining the particles onto the top membrane, solvent from the at least one orthogonal flow inlet port impinges on the particles, resulting in the particles flowing toward the at least two sample outlet ports at a height below the top membrane according to sizes of the particles.

Thus, methods may also include executing, by a computer system, a set of logical operations to cause the particles to flow to the at least two sample outlet ports according to sizes of the particles, resulting in fractions of the sample in accordance with the sizes.

Computer System

Figure 8:
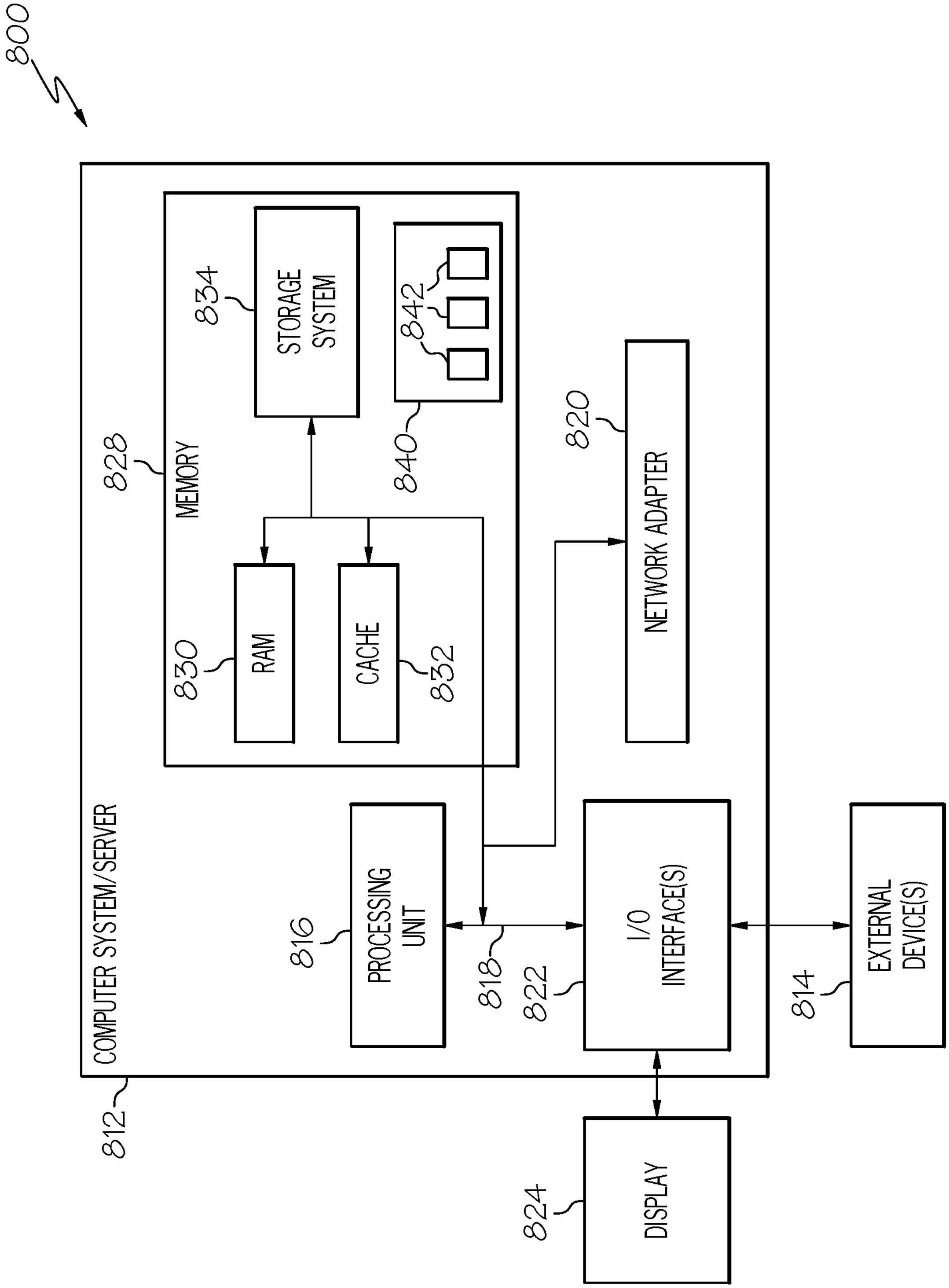
FIG. 8 depicts a computer system for performing field flow fractionation with one or more of the field flow fractionators disclosed herein, in accordance with one embodiment.

FIG. 8 depicts a computer system 800 for performing field flow fractionation with one or more of the field flow fractionators disclosed herein, in accordance with one embodiment. Computer system 800 is only one example of a computer system and is not intended to suggest any limitation as to the scope of use or functionality of embodiments of the present invention. Regardless, computer system 800 is capable of being implemented to perform and/or performing any of the functionality/operations of the present invention.

Computer system 800 includes a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 812 may be described in the general context of computer system-executable instructions, such as program modules, being executed by a computer system. Generally, program modules may include routines, programs, objects, components, logic, and/or data structures that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in computer system 800 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 812 typically includes a variety of computer system readable media. Such media may be any available media that is accessible by computer system/server 812, and includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions/operations of embodiments of the invention.

Program/utility 840, having a set (at least one) of program modules 842, may be stored in memory 828 by way of example, and not limitation. Exemplary program modules 842 may include an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the present invention.

Computer system/server 812 may also communicate with one or more external devices 814 such as a keyboard, a pointing device, a display 824, one or more devices that enable a user to interact with computer system/server 812, and/or any devices (e.g., network card, modem, etc.), that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet), via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been shown and described with reference to specific embodiments, it should be understood by those skilled in the art that various changes in form and detail may be made therein without departing from the spirit and scope of the invention as recited in the accompanying claims.

What is claimed is:

1. A continuous field flow fractionator comprising:

a top plate assembly including:

an inject port, an inlet port, a hold port, and a sample outlet port;

a first membrane;

a first frit; and a bottom plate assembly;

wherein the top plate assembly, the first membrane, the first frit, and the bottom plate assembly define a separation channel;

wherein, during a hold phase, a solvent flowing from the inlet port, a sample flowing from the inject port, and a solvent flowing from the hold port define an accumulation region, wherein the solvent flowing from the hold port impinges on particles of the sample flowing from the inject port, wherein a set of the particles flows back toward the accumulation region, wherein a remainder of the particles flow toward the sample outlet port, and wherein, during a transfer phase, a subset of the set of particles flows toward the sample outlet port, such that during a subsequent hold phase, the subset of particles elutes through the sample outlet port, resulting in at least one fraction of the sample for a cycle corresponding to each of the hold phase and the transfer phase.

2. The continuous field flow fractionator of claim 1, wherein the hold port is located closer to the sample outlet port than the inject port and the inlet port.

3. The continuous field flow fractionator of claim 1, wherein the accumulation region is located between:

at least one of the inlet port and the inject port; and the hold port.

4. The continuous field flow fractionator of claim 1, wherein a separation region is defined between the hold port and the sample outlet port.

5. The continuous field flow fractionator of claim 1, further comprising a solvent outlet port, wherein the solvent outlet port is configured to extract sample-free solvent.

* * * * *